(12) United States Patent
Sato et al.

(10) Patent No.: US 7,598,887 B2
(45) Date of Patent: Oct. 6, 2009

(54) PARKING ASSIST APPARATUS

(75) Inventors: Kosuke Sato, Anjo (JP); Kazuya Watanabe, Anjo (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 338 days.

(21) Appl. No.: 11/640,243

(22) Filed: Dec. 18, 2006

(65) Prior Publication Data
US 2007/0146166 A1 Jun. 28, 2007

(30) Foreign Application Priority Data
Dec. 28, 2005 (JP) .............................. 2005-377427

(51) Int. Cl.
*B60Q 1/48* (2006.01)
(52) U.S. Cl. ..................... 340/932.2; 701/28
(58) Field of Classification Search ............. 340/932.2, 340/435, 436, 903; 701/26, 28, 41
See application file for complete search history.

(56) References Cited

U.S. PATENT DOCUMENTS

| 6,476,730 | B2 * | 11/2002 | Kakinami et al. ........ 340/932.2 |
| 6,611,744 | B1 | 8/2003 | Shimazaki et al. |
| 6,657,555 | B2 * | 12/2003 | Shimizu et al. .......... 340/932.2 |
| 6,940,423 | B2 * | 9/2005 | Takagi et al. ............. 340/932.2 |
| 7,043,346 | B2 * | 5/2006 | Kubota et al. ................. 701/28 |
| 2008/0158011 | A1 * | 7/2008 | Yamanaka ............... 340/932.2 |

FOREIGN PATENT DOCUMENTS

JP 2001-55099 A 2/2001

* cited by examiner

*Primary Examiner*—John A Tweel, Jr.
(74) *Attorney, Agent, or Firm*—Sughrue Mion, PLLC

(57) ABSTRACT

A parking assist apparatus includes a monitor displaying an image captured by a camera mounted to a vehicle for capturing an image in a moving direction of the vehicle and an assist information output device outputting assist information for assisting a parking operation and displaying the assist information on the monitor, wherein the assist information output device: calculates a locus for guiding the vehicle to a parking position specified on the image displayed on the monitor; sets a target position on the locus for guiding the vehicle to the parking position; outputs guide information corresponding to the target position so as to be displayed on the locus in the image displayed on the monitor; and outputs a navigation mark corresponding to a current position of the vehicle so as to be displayed on the monitor.

9 Claims, 9 Drawing Sheets

Stop button

Confirm button

Stop button

Locus display button

"Please drive the vehicle until the red line enters the yellow frame"

"Fully rotate the steering wheel to the right so that the red line enters the yellow frame"

"Set the shift lever to a rear position, fully rotate the steering wheel to the left and move the vehicle until the red line enters the yellow frame"

"Set the shift lever to a rear position,
fully rotate the steering wheel to the right and move
the vehicle until the red line enters the yellow frame"

"Parking operation has been completed"

PARKING ASSIST APPARATUS

CROSS REFERENCE TO RELATED APPLICATIONS

This application is based on and claims priority under 35 U.S.C. § 119 to Japanese Patent Application 2005-377427, filed on Dec. 28, 2005, the entire content of which is incorporated herein by reference.

FIELD OF THE INVENTION

The present invention relates to a parking assist apparatus including: a monitor displaying an image captured by a camera that is mounted to a vehicle body; and an assist information output means outputting assist information for assisting a parking operation so as to be displayed on the monitor.

BACKGROUND

A known parking assist apparatus disclosed in JP 2001-55099A displays an image captured by a camera provided at a rear end of the vehicle, when a driver executes a back-in parking operation and positions a shift lever to a reverse position, a steering wheel operation guideline, a vehicle width guideline and a locus guideline are superimposed on the image captured by a rear camera and displayed on a monitor.

As the vehicle is moved backward, the steering wheel operation guideline approaches a target point. When the steering wheel operation guideline reaches the target point, the driver stops the vehicle and operates a steering wheel. While the steering wheel has been operated, a steering wheel operation amount guide mark is moved on the monitor. After the steering wheel operation amount guide mark reaches a target point, the driver further moves the vehicle backward to be in a parking space such as a parking stall appropriately.

When the vehicle is guided so as to be in a parking position, the vehicle needs to be moved appropriately as much as possible along a locus, which is calculated in order to guide the vehicle to be in the parking position. Especially, when an inexperienced driver executes a parking operation, or when a parking space is narrow, the parking assist operation needs to be executed precisely. By use of the above mentioned known parking assist apparatus, although the driver can execute the back-in parking operation accurately, when it comes to parallel parking, because the vehicle needs to be moved back and forth, and the steering wheel needs to be moved to one direction and the other direction; it is important for the driver to understand a relative relation between a current position of the vehicle and the parking position and understand the current position of the vehicle relative to an appropriate locus. Especially, because the driver moves the vehicle so as to follow the appropriate locus toward to the parking position in a manner where he/she confirms a relative relation between the vehicle and the parking position on the image displayed on the monitor, the image on the monitor needs to be easy to understand.

A need thus exists to provide a parking assist apparatus by which, even when the vehicle is parallel-parked by moving the vehicle back and forth and rotating the steering wheel in one direction and the other direction, the driver appropriately operates the vehicle, on the basis of the information displayed on the monitor, to be in the parking position.

SUMMARY OF THE INVENTION

According to an aspect of the present invention, a parking assist apparatus includes a monitor displaying an image captured by a camera mounted to a vehicle for capturing an image in a moving direction of the vehicle; and assist information output device outputting assist information for assisting a parking operation and displaying the assist information on the monitor, wherein the assist information output device: calculates a locus for guiding the vehicle to a parking position specified on the image displayed on the monitor; sets a target position on the locus for guiding the vehicle to the parking position; outputs guide information corresponding to the target position so as to be displayed on the locus in the image displayed on the monitor; and outputs a navigation mark corresponding to a current position of the vehicle so as to be displayed on the monitor.

According to another aspect of the present invention, a parking assist apparatus includes: a monitor displaying an image captured by one of a front camera and a rear camera, the front camera mounted to a vehicle for capturing an image of a front area of the vehicle and the rear camera mounted to a vehicle for capturing an image of a rear area of the vehicle; and assist information output means outputting assist information for assisting a parking operation and displaying the assist information on the monitor, wherein the assist information output means: calculates a locus for guiding the vehicle so as to be in a parking position specified on the image displayed on the monitor; sets a target position on the locus for guiding the vehicle to the parking position within the front area of the vehicle on the basis of a front end of the vehicle; sets a target position on the locus for guiding the vehicle to the parking position within the rear area of the vehicle on the basis of a rear end portion of the vehicle; outputs, while the vehicle is moving forward, guide information corresponding to the target position set within the front area of the vehicle so as to be displayed on a ground in the image of the front area displayed on the monitor; outputs, while the vehicle is moving forward, a navigation mark corresponding to a current position of a front end of the vehicle so as to be displayed on the monitor; outputs, while the vehicle is moving backward, guide information corresponding to the target position set within the rear area of the vehicle so as to be displayed on a ground in the image of the rear area displayed on the monitor; and outputs, while the vehicle is moving backward, a navigation mark corresponding to a current position of a rear portion of the vehicle so as to be displayed on the monitor.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

An embodiment related to the present invention will be explained in accordance with the attached drawings.

(Entire Configuration)

Figure 1:
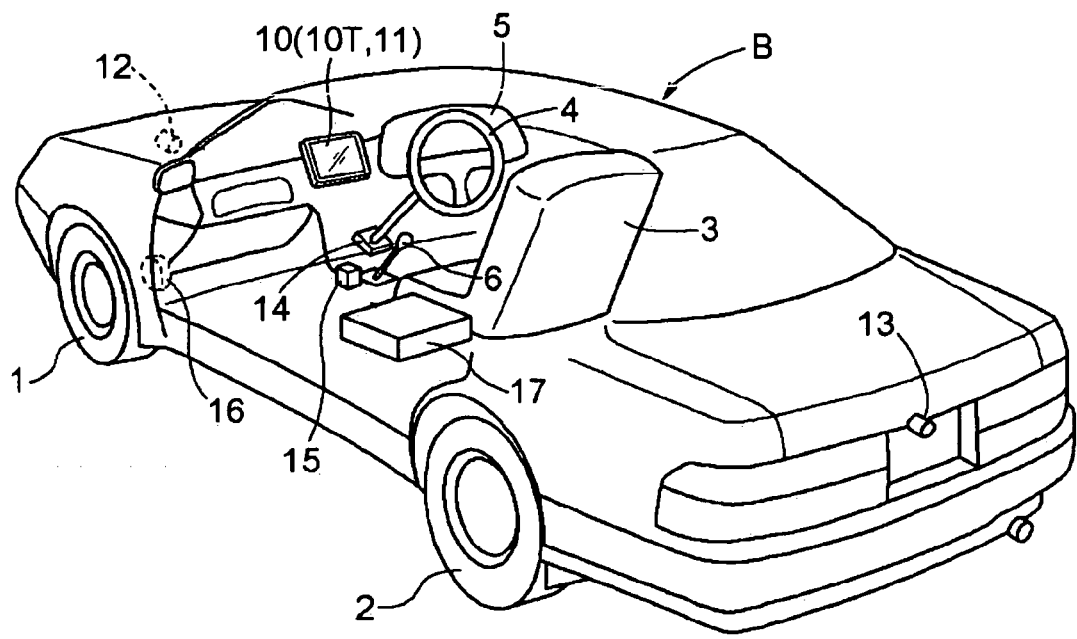
FIG. 1 illustrates an oblique perspective view of a vehicle in which a part of the vehicle is taken off.
Figure 2:
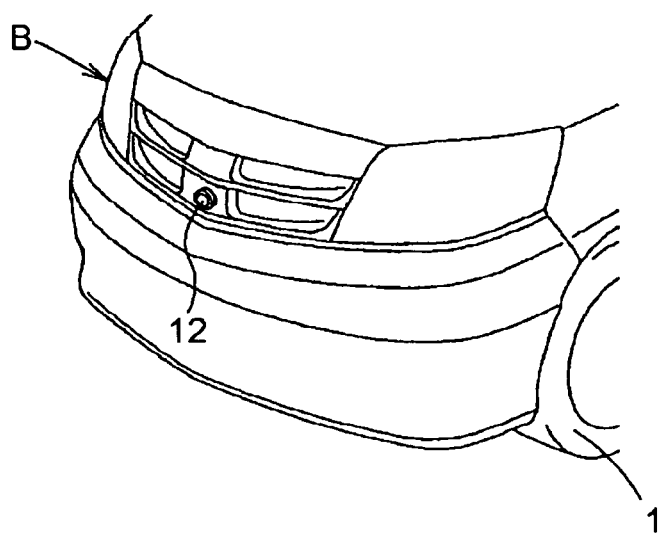
FIG. 2 illustrates an oblique perspective view of a front portion of the vehicle.
Figure 3:
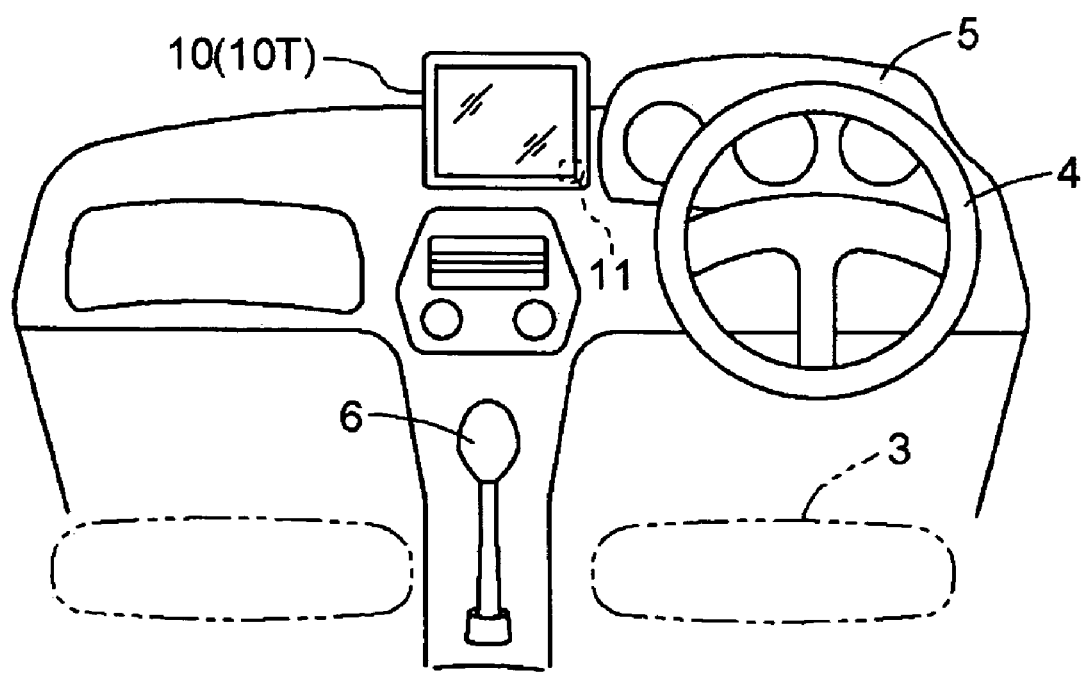
FIG. 3 illustrates a front portion of inside of the vehicle.

As shown in FIGS. 1 through 3, a vehicle B includes front wheels 1, rear wheels 2, and further includes a driver's seat 3 and a steering wheel 4 inside a compartment thereof. Furthermore, a panel 5 on which, for example, various kinds of meters are arranged is provided in front of the steering wheel 4. The steering wheel 4 is connected to a steering operation system for transmitting a rotational operation force of the steering wheel 4 to the front wheel 1.

More specifically, the vehicle B further includes a transmission mechanism such as a torque converter, which transmits power from an engine, that is provided at a front portion of the vehicle body, the front wheel 1 or the rear wheel 2. The transmission mechanism is provided in the vicinity of a central portion of the vehicle B, and a shift lever 6 for controlling the transmission mechanism is provided at the side of the driver's seat 3.

Further, as shown in FIG. 1, at an upper portion of a console at the side of the driver's seat 3, a monitor 10 is provided. Specifically, the monitor 10 includes: a touch panel 10T at a display surface of the monitor 10; and a speaker 11. The speaker 11 may be provided at the panel 5 or inside a door of the vehicle body.

The vehicle B includes: a front camera 12 at a front end thereof; and a rear camera 13 at a rear end thereof. An operation system of the steering wheel 4 includes a steering sensor 14 measuring an angle and an operation amount thereof. An operation system of the shift lever 6 includes a shift position sensor 15 determining a position of the shift lever 6.

The transmission mechanism includes a moving distance sensor 16 measuring a moving amount of the vehicle B on the basis of a rotation amount of a drive train. A photo interrupter-type sensor or a pickup-type sensor for measuring a rotation amount of one of the front wheel 1 and the rear wheel 2 may be used as the moving distance sensor 16.

The monitor 10 is a liquid crystal monitor having a backlight. The monitor 10 may be a plasma display type monitor or a CRT type monitor. The touch panel 10T is a pressure-sensitive type panel or an electrostatic type panel so that a position on which a user touches the touch panel 10T by using his/her finger the panel is outputted as a locate data. The monitor 10 may be commonly used by a GPS navigation system.

The front camera 12 and the rear camera 13 houses CCD type image sensor elements and outputs a captured image as a motion image information. Specifically, the front camera 12 is positioned so as to mainly capture a forward ground, and the rear camera 13 is positioned so as to mainly capture a rearward ground. Each camera has a capability of outputting a motion image consisting of more than ten frames per second.

Figure 4:
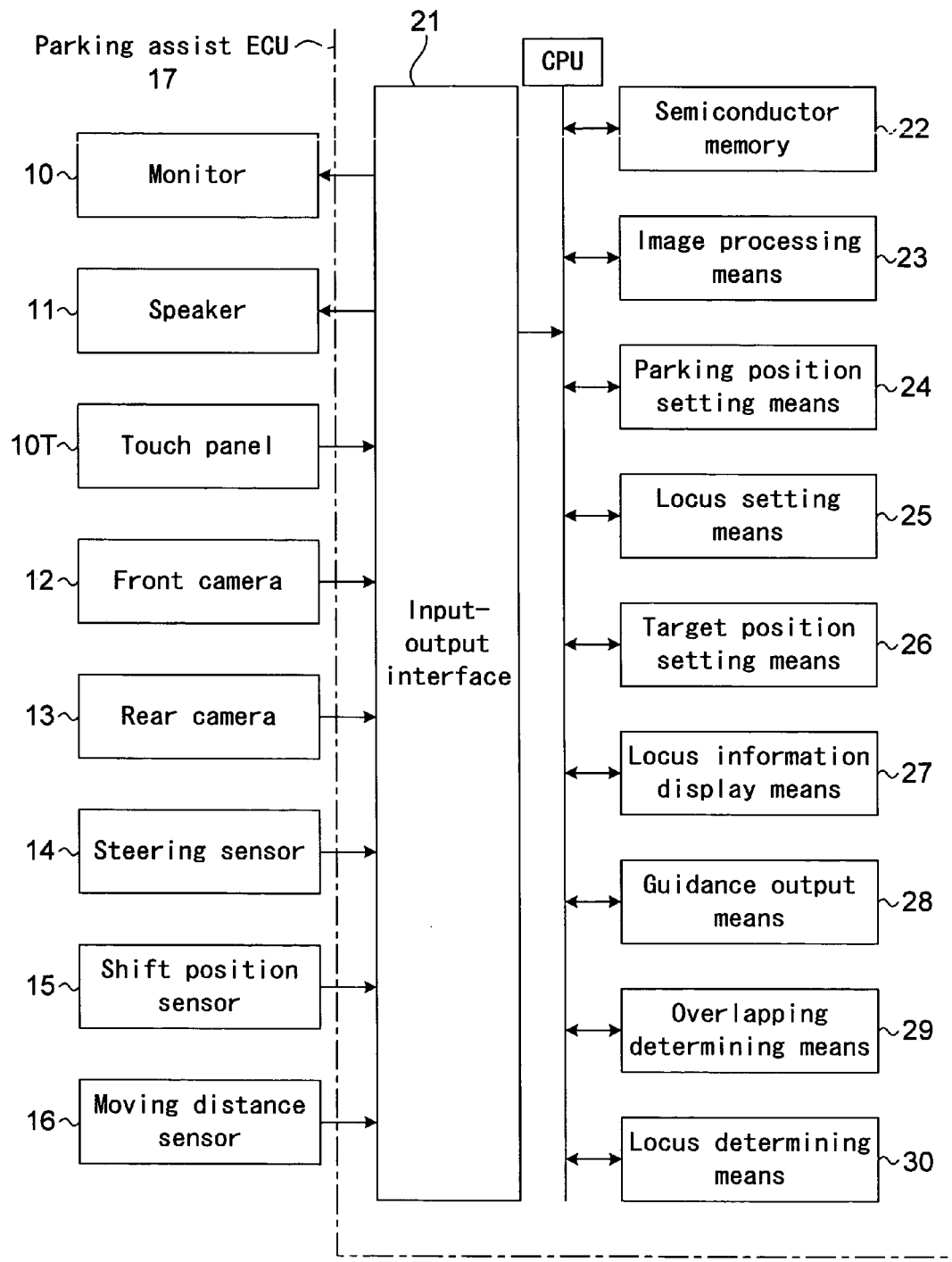
FIG. 4 illustrates a block circuit diagram of a control system.

An operation system of the parking assist apparatus according to the present invention is illustrated in FIG. 4. A parking assist ECU 17 functions as an assist information output means. Information from each of the touch panel 10T, the front camera 12, the rear camera 13, the steering sensor 14, the shift position sensor 15 and the moving distance sensor 16 is sent to the parking assist ECU 17. The parking assist ECU 17 processes the information and computes assist information for the parking operation. The assist information is outputted as an image to the monitor 10, and the assist information is outputted as a sound to the speaker 11.

More specifically, the parking assist ECU 17 includes an input-output interface 21, a microprocessor CPU, a semiconductor memory 22, an image processing means 23, a parking position setting means 24, a locus setting means 25, a target position setting means 26, a locus information display means 27, a guidance output means 28, an overlapping determining means 29 and a locus determining means 30. The input-output interface 21 inputs and outputs information, and the microprocessor CPU processes the information outputted by the input-output interface 21. The semiconductor memory 22, the image processing means 23, the parking position setting means 24, the locus setting means 25, the target position setting means 26, the locus information display means 27, the guidance output means 28, the overlapping determining means 29 and the locus determining means 30 are connected to the microprocessor CPU by means of a data bus. In this control system, in addition to the data bus, a control bus and an address bus are provided, however, in this embodiment, such additional busses or an additional interface are not illustrated in order to simplify the drawing.

The image processing means 23 executes a process for displaying the image captured by the front camera 12 or the rear camera 13 on the monitor 10 in real time, at the same time, displaying a composite image in which a parking area 45, a guide information G and a navigation mark H are superimposed.

The parking position setting means 24 sets a parking position on the basis of a user's physical operation on the touch panel 10T, for example a user's touch on the touch panel 10T. The locus setting means 25 calculates, on the basis of a current position of the vehicle B, a locus C for guiding the vehicle B to be in a parking position P. The target position setting means 26 sets a target position, for example plural target positions, at midpoints of the locus C. The locus information display means 27 displays information such as a guide information G corresponding to one of the target positions and a navigation mark H. The guide information G and the navigation mark H are used for determining a position of the vehicle B. The locus setting means 25 may calculate plural loci C and selects an appropriates locus C from the plural loci C depending on the situation. For example, if an obstacle exists on the ground, the locus setting means 25 selects an appropriate locus C, by which the vehicle avoids the obstacle, and displays this appropriate locus C on the monitor 10.

The guidance output means 28 outputs information required for the vehicle B to be moved upon the locus C. The overlapping determining means 29 determines whether or not the guide information G is positioned so as to overlap the navigation mark H on the monitor 10. The locus determining means 30 determines a positional relationship between a current position of the vehicle B and the locus C on the basis of the information detected at the moving distance sensor 16 and the steering sensor 14.

In this embodiment, each of the image processing means 23, the parking position setting means 24, the locus setting means 25, the target position setting means 26, the locus information display means 27, the guidance output means 28, the overlapping determining means 29 and the locus determining means 30 is comprised of a software executed on the semiconductor memory 22, however, each of the above mentioned means may be comprised of a hardware such as a logic, or a combination of a software and a hardware.

Figure 6:
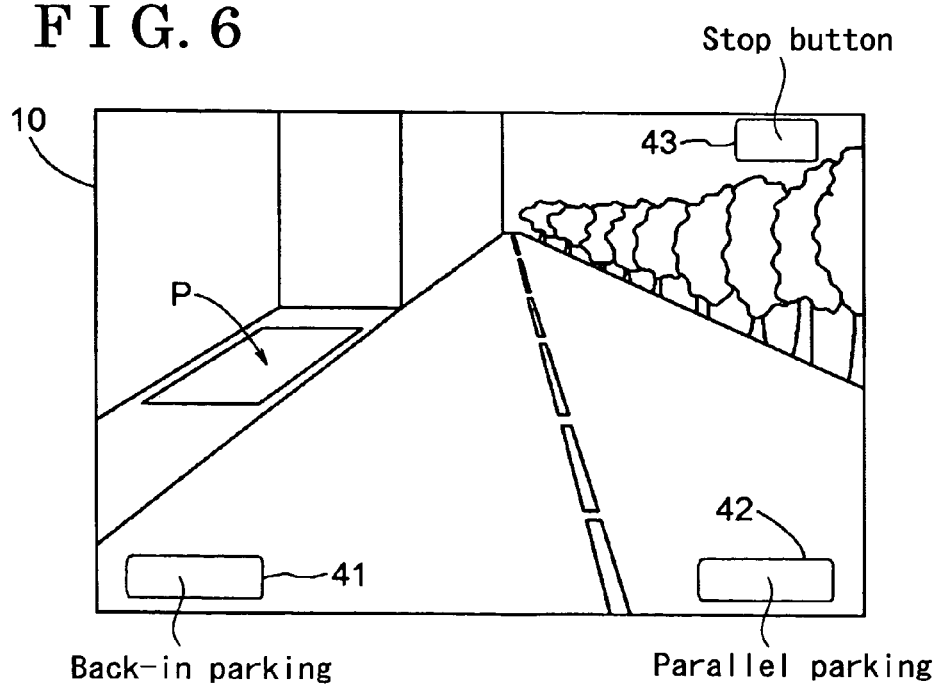
FIG. 6 illustrates a diagram indicating an image including a parking position and displayed on the monitor.

When the parking operation of the vehicle B to the parking position P is executed, the driver temporarily stops the vehicle B at a position where the parking position P is captured by the front camera 12, and an image as illustrated in FIG. 6 is displayed on the monitor 10. Then, the driver determines the parking position P on the monitor 10, and the parking assist ECU 17 calculates a positional relationship between a current position of the vehicle B and the parking position P in order to calculate an appropriate locus C by which the vehicle B is guided to be in the parking position P. Thus, the parking assist apparatus displays on the monitor 10 necessary assist information for the driver to move the vehicle B so as to follow the locus C, as a result, the driver can park the vehicle B to the parking position P along the locus C by simply following a guidance message outputted from the speaker 11 or by following an assist information displayed on the monitor 10.

Figure 5:
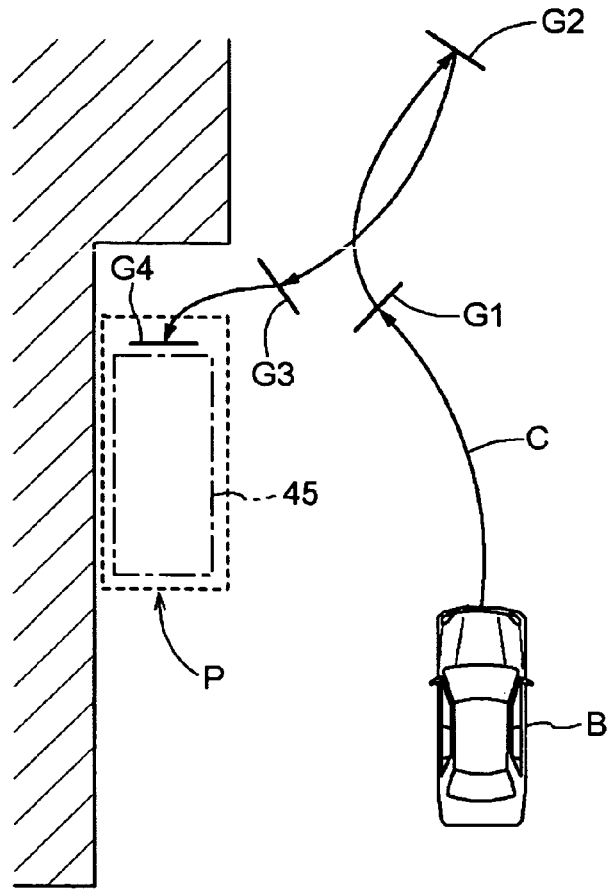
FIG. 5 illustrates a locus and a guide information by which the vehicle is guided to be in the parking position.
Figure 13:
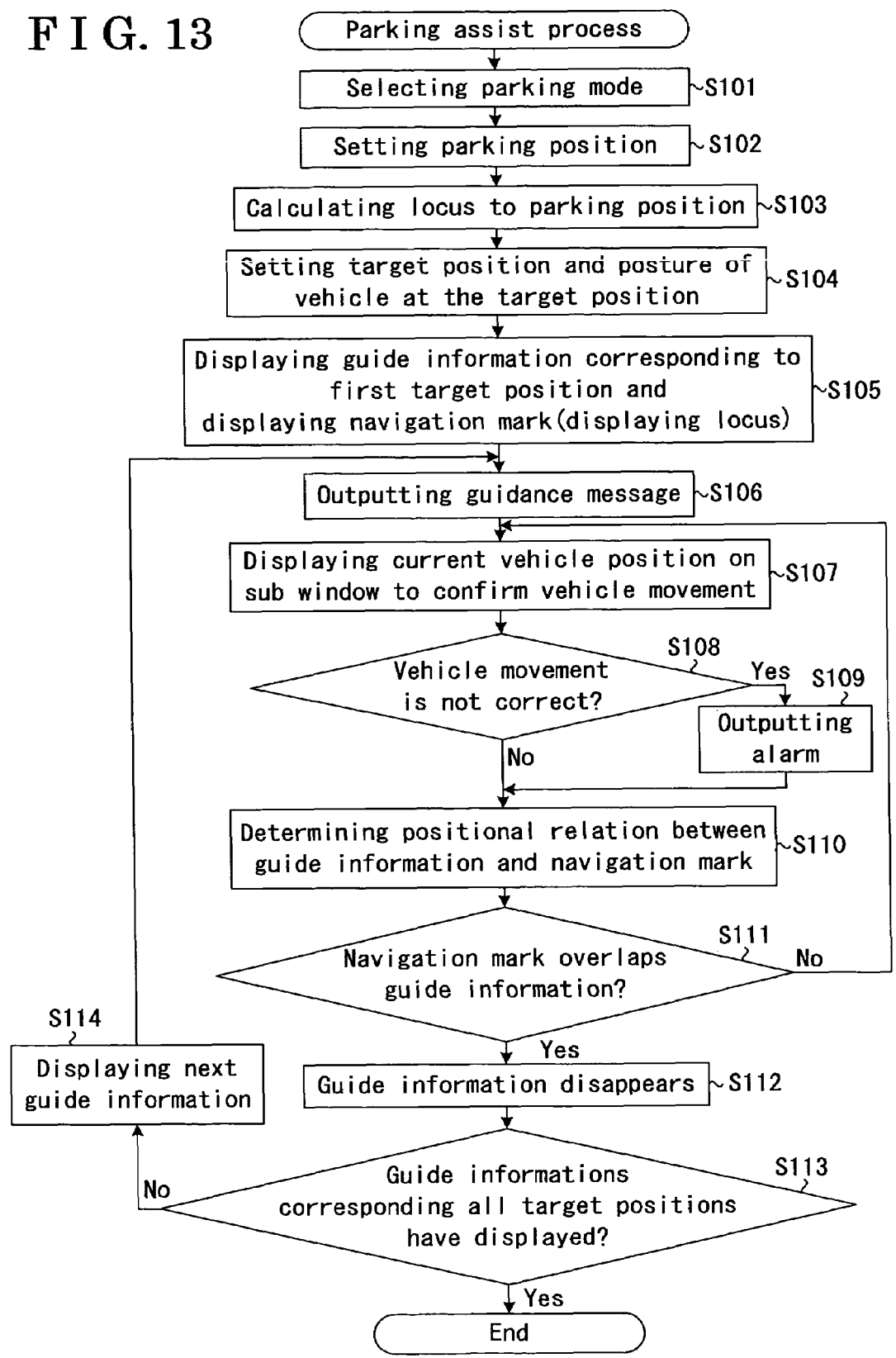
FIG. 13 illustrates a flow chart of a parking assist process.

A process executed by the parking assist ECU 17 is indicated by a flowchart illustrated in FIG. 13. When the vehicle B is to be parked, for example, when parallel parking is executed, the driver temporarily stops the vehicle at a position as illustrated in FIG. 5, at which the parking position P is captured by the front camera 12. The captured image is displayed on the monitor 10 as illustrated in FIG. 6. At this point, a back-in parking button 41, a parallel parking button 42 and a stop button 43 are displayed on the monitor 10. If the driver touches the parallel parking button 42 with his/her finger, a parallel parking mode is selected (S101). If the driver touches the back-in parking button 41 with his/her finger, a back-in parking mode is selected. If the driver touches the stop button 43, the parking assist operation is stopped.

In this embodiment, the parking assist apparatus executes a parallel parking mode and a back-in parking mode. Specifically, in the parallel parking mode, the vehicle B is temporarily stopped at a position where the parking position P is captured by the front camera 12 and then guided to a parking position P so as to be parallel relative to a posture of the vehicle at the temporarily stopped position. On the other hand, in the back-in parking mode, the vehicle B is stopped at a temporarily stop position and then guided to the parking position P so as to be orthogonal relative to a posture of the vehicle B at the temporarily stopped position. The front camera.

When the driver touches the back-in parking button 41, in the same manner as when touching the parallel parking, a locus C for guiding the vehicle B to the parking position P will be calculated, an assist information for the back-in parking is then displayed on the monitor 10, and a guidance message for the back-in parking is outputted by the speaker 11 as an assist information. Thus, the driver can park the vehicle B to the parking position P along the locus C by simply following the guidance message outputted from the speaker 11 or by following the assist information displayed on the monitor 10. Types of the parking is not limited to the parallel parking and the back-in parking, for example, the parking assist apparatus may executes oblique parking.

Figure 7:
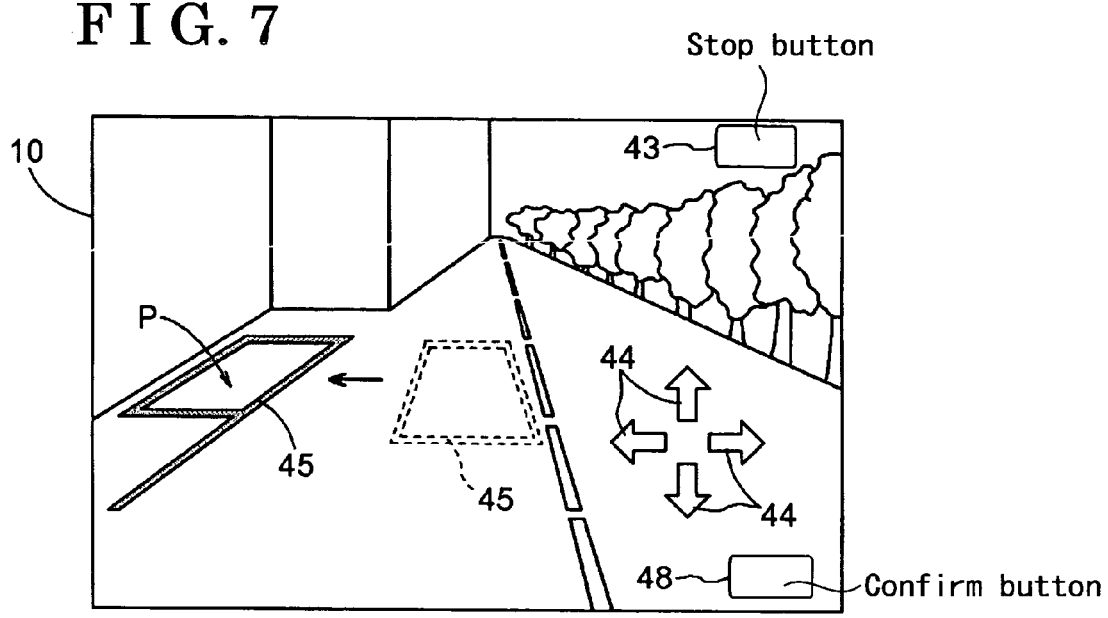
FIG. 7 illustrates a diagram indicating an image displayed on the monitor on which the parking position is set.

After the driver selects the parallel paring mode, as illustrated in FIG. 7, four cursor buttons 44 and a parking area 45 are displayed on the monitor 10. Specifically, the parking area 45 is formed in a frame shape in order to specify the parking position P. In an initial stage of the process, the parking area 45 is located at the central position of the monitor 10 as indicated with a dashed line. While the cursor buttons 44 and the parking area 45 are displayed on the monitor 10, the driver touches one of the cursor buttons 44 in order to move the parking area 45 toward the parking position P on the monitor 10. After the parking area 45 has been moved to an appropriate position (parking position P), the driver touches a confirm button 48 to fix the position of the parking area 45 on the monitor 10. In this way, an area enclosed by the parking area 45 is set as a parking position P (S102). This process is executed by the parking position setting means 24, and a size of the parking area 45 is set on the basis of an entire length and an entire width of the vehicle B. The cursor buttons 44 and the parking area 45 are displayed on the monitor 10 by the image processing means 23.

Because the front camera 12 is equipped with a wide angle lens, the perspective of the image captured by the front camera 12 is emphasized and distorted. For example, in the image captured by the wide-angle lens, an object formed in a line shape is generally displayed so as to be curved. However, because the lens of the front camera 12 according to the embodiment has a fixed focal characteristics, a focal length has been fixed, as a result, a level of the ground in the capture image is identical to a level at which the front wheel 1 contacts the ground and the rear wheel 2 contacts the ground so that a relative distance between a specific position of the ground in the image displayed on the monitor 10 and the vehicle can be obtained by processing the image.

Thus, by setting table data or a parameter for the image processing means 23 for calculating a distance between a specific position of the image displayed on the monitor 10 and the vehicle B, after the parking 45 is moved by the driver, the parking 45 has been deformed so as to match the perspective image (distorted image) on the monitor 10, at the same time, the parking position P (parking area 45) relative to the vehicle B can be specified. In this configuration, a relative position and a distance between the parking position P and the vehicle B can be highly accurately calculated. The rear camera 12 performs in the same manner as that front camera 12.

Then, on the basis of the relative distance between the temporally stop position of the vehicle B and the parking position P, a locus C (see FIG. 5) used for guiding the vehicle B to the parking position P is calculated (S103). Further, a target position, for example relative to a front end of the vehicle are set upon the locus C. Depending on a positional relation and a distance between the parking position P and the vehicle B, plural target positions are set on the locus C. Furthermore, a posture of the vehicle B at each target position is calculated (S104). These operations are executed by the locus setting means 25. On the basis of an entire length, an entire width, a wheel base and a tread of the vehicle B, the locus setting means 25 calculates an appropriate locus C using a relative positional relation and a relative distance between a current position of the vehicle B and the parking position P. This calculated locus C can be illustrated as a line in FIG. 5. As illustrated in FIG. 5, in this example, four target positions are set upon the locus C, and each of the guide information G1 through G4 is set to the target position respectively.

The locus setting means 25 calculates plural loci C, and the driver may select an appropriate locus C depending on the situation from the calculated loci C. For example, if an obstacle exists on the ground, the driver selects an appropriate locus C following which the obstacle can be avoided. This selecting means is not illustrated in the drawings, however, the driver may confirm a relative relation between the vehicle B and the obstacle by operating the locus display button 47 or the like to display the calculated locus/loci C on the monitor 10, and then may select an appropriate locus C.

A position at which the steering wheel 4, rotated in one direction, is switched to be rotated in the other (opposite) direction, or a position at which the vehicle B moving forward is switched to be moved backward (a borderline between a forward movement area and a backward movement area) is set as a target position. Further, each guide information G1 through G4 set to the target position is formed in a line shape and postured in a manner where a longitudinal direction of each line is identical to a width direction of the vehicle B. The guide information G1 through G4 are displayed on the ground in the captured image displayed on the monitor 10. Thus, the vehicle B is positioned and postured at an appropriate position while parallel parking is executed by driving the vehicle B in a manner where each of the guide information G1 through G4 overlaps the navigation mark H so that the front end of the vehicle B is positioned and postured so as to correspond to each of the guide information G1 through G4.

Figure 8:
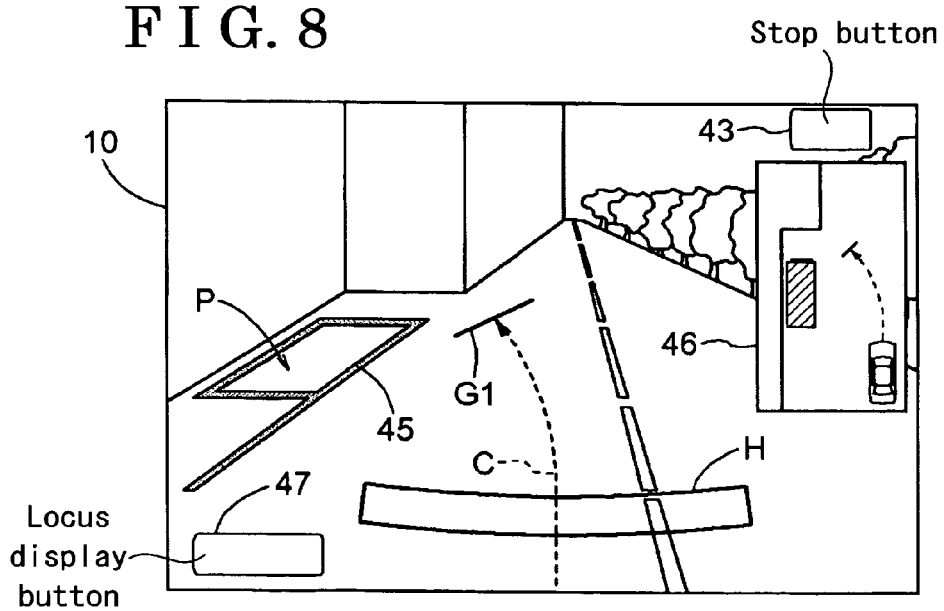
FIG. 8 illustrates a diagram indicating an image displayed on the monitor on which a first guide information is set.
Figure 9:
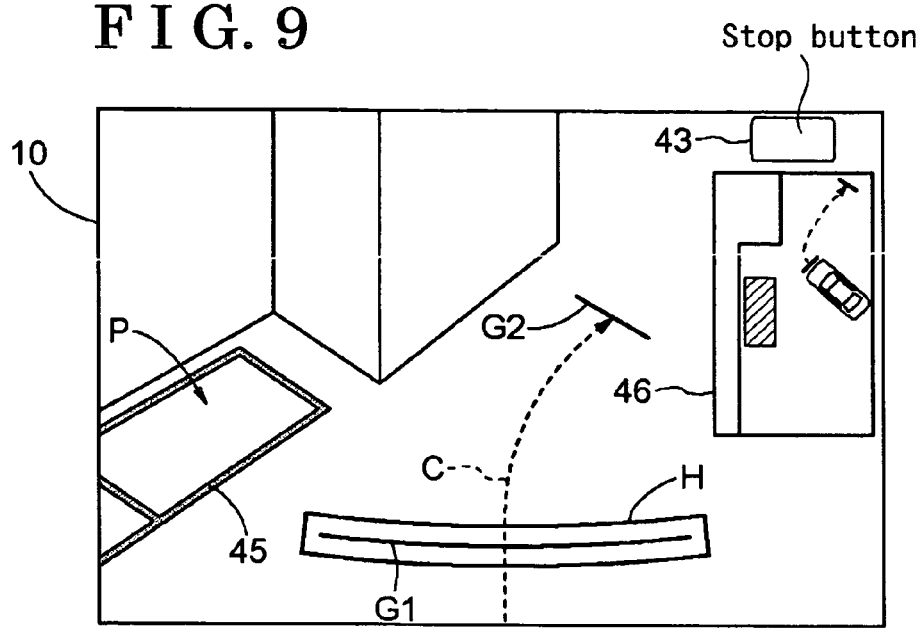
FIG. 9 illustrates a diagram indicating an image displayed on the monitor on which the first guide information overlaps the navigation mark.

As illustrated in FIG. 8, the guide information G1 corresponding to the first target position is displayed in red on the ground in the captured image on the monitor 10, at the same time, a navigation mark H in yellow is displayed at the bottom portion of the monitor 10. The navigation mark H is formed in a rectangular frame shape extending in a width direction of the vehicle B in order to enclose the guide information G1 (S105). This process is executed by the image processing means 23 in a manner where a guide information G, generated by the target position setting means 26, is composed in the image captured by the front camera 12. The colors of the guide information G1 and the navigation mark H are not limited to the abovementioned examples and may be changed to any other color as long as they differentiate from each other.

As mentioned above, the guide information G is displayed on the ground in the captured image displayed on the monitor 10, and when the vehicle B is moved toward the guide information G, the guide information G needs to be displayed in a manner where, in the displayed image, the guide information G is moved so as to approach the vehicle B together with the ground. This process is executed by the image processing means 23.

As shown in FIG. 8, on the monitor 10, a sub window 46 and the locus display button 47 are additionally displayed. Specifically, in the sub window 46, an overhead view indicating a positional relation between the parking position and the current position of the vehicle B is shown.

A locus C in red is displayed on the ground in the captured image only when the driver operates the locus display button 47, otherwise the locus C does not appear on the monitor 10. Further, during this operation, a guidance message such as "Please drive the vehicle until the red line enters the yellow frame" is outputted by the speaker 11 (S106). These processes are executed by the guidance output means 28. In addition to this guidance message, a signal or texts may be displayed on the monitor to notify the driver of the guidance message.

A direction of the vehicle B that is moved following the abovementioned guidance is determined on the basis of the information from the shift position sensor 15. Further, the steering sensor 14 detects an amount of the steering operation, and the moving distance sensor 16 detects a moving distance of the vehicle B. On the basis of the detected information, a moving state of the vehicle B is displayed on the sub window 46, and thus, it can be determined whether or not the vehicle B is moved so as to follow the locus C. When it is determined that the vehicle B is moved without following the locus C and distancing from the locus C for more than a predetermined distance, the locus determining means 30 outputs an alarm (S107 through S109).

An example of the operation where the alarm is given is not illustrated in the drawings, however, a means for notifying the driver of the vehicle B distancing itself from the locus C may be text information displayed on the monitor 10 or a voice message outputted by the speaker 11. Both of the text information and the voice message may be outputted simultaneously. Further, according to the parking assist apparatus, because the guide information G approaches and overlaps the navigation mark H as the vehicle B is moved, a motion of the vehicle B can be adjusted by moving the vehicle forward or backward little by little or operating the steering wheel 4 of the vehicle B.

After the vehicle B is further moved forward so that the guide information G1 is enclosed by the navigation mark H, in other words the guide information G1 overlaps the navigation mark H, the vehicle is stopped. At this point, the color of the guide information G1 surrounded by the navigation mark H is changed from red to green. After the color is changed from red to green, and the vehicle is stopped, the guide information G1 is deleted from the monitor 10 and new (second) guide information G2 appears on the monitor 10 (S110 through S114). The overlapping determining means 31 determines whether or not the guide information G overlaps the navigation mark H on the basis of a captured image by the front camera 12, and the guidance output means 28 deletes the guide information G1 and display the guide information G2.

Thus, when the vehicle B is moved so that the first guide information G1 is enclosed by the navigation mark H, in other words, the guide information G1 overlaps the navigation mark H, a voice message such as "Fully rotate the steering wheel to the right so that the red line enters the yellow frame" is outputted by the speaker 11 (S106). This message may be displayed in text form on the monitor 10.

Further, the process from S107 to S112 are repeated until the vehicle is moved so that the guide information G4 (fourth guide information) is enclosed by the navigation mark H. Images displayed on the monitor during the above mentioned processes are illustrated in FIGS. 9 through 12.

Figure 10:
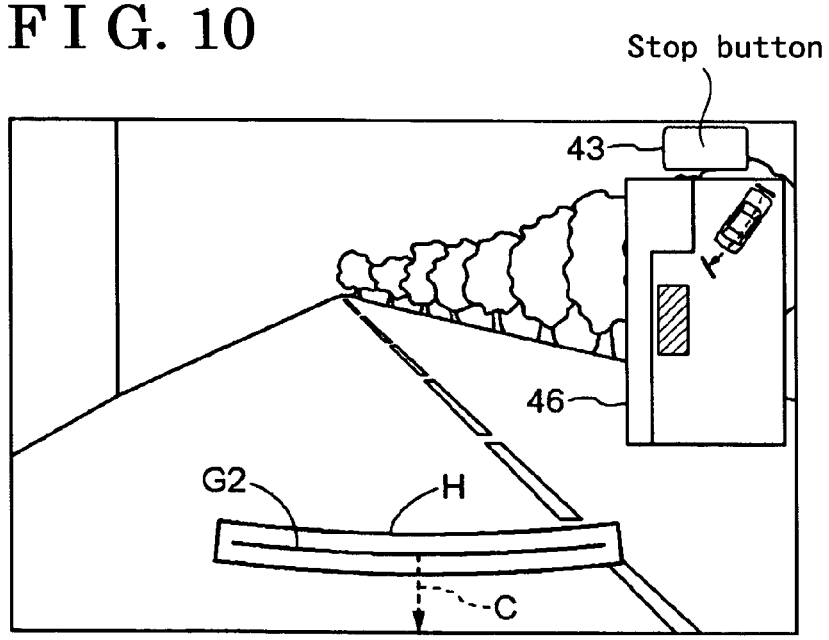
FIG. 10 illustrates a diagram indicating an image displayed on the monitor on which a second guide information overlaps the navigation mark.
Figure 11:
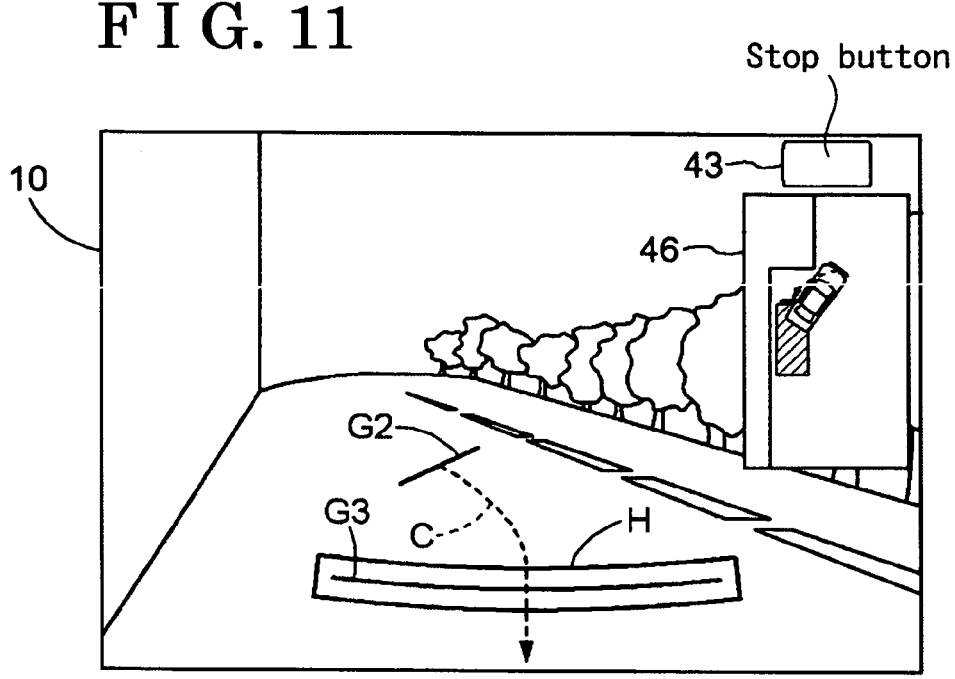
FIG. 11 illustrates a diagram indicating an image displayed on the monitor on which a third guide information overlaps the navigation mark.
Figure 12:
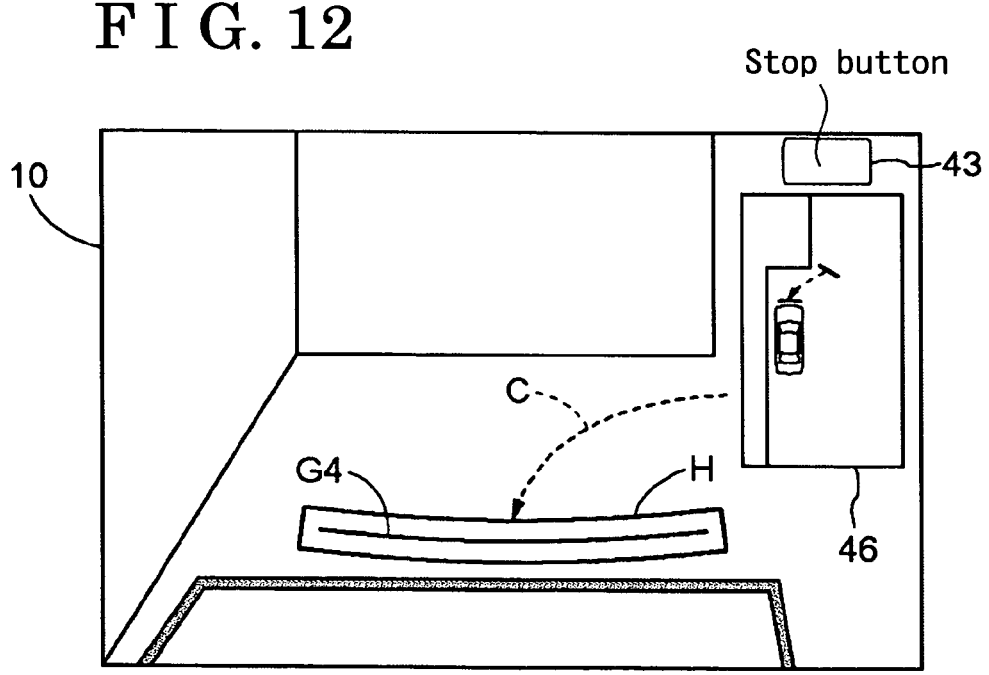
FIG. 12 illustrates a diagram indicating an image displayed on the monitor on which the parking operation has been completed.

When the vehicle B is moved so that the second guide information G2, which appears on the monitor 10 following the guide information G1, is enclosed by the navigation mark H, in other words, the guide information G2 overlaps the navigation mark H, the color of the guide information G2 is changed from, for example, red to green in FIG. 10. After the guide information G2 becomes green, and the vehicle is stopped, the guide information G2 disappears from the monitor 10, and a message such as "set the shift lever to a rear position, fully rotate the steering wheel to the left and move the vehicle until the red line enters the yellow frame" is outputted by the speaker 11. At the same time, this message may be changed to the text form and displayed on the monitor 10.

When the above message is outputted or displayed, next guide information G3 is still not displayed on the ground in the image displayed on the monitor 10, however, the guide information G3 is displayed in the sub window 46. Thus, as the vehicle B is moved backward and the steering wheel 4 is rotated, the guide information G3 gradually appears from a lower side of the monitor 10. Further, when the guide information G3 reaches the navigation mark H so as to be enclosed, the vehicle B is stopped. At this point, a message such as "still set the shift lever to the rear position, fully rotate the steering wheel to the right, and move the vehicle until the red line enters the yellow frame" is outputted by the speaker 11. At the same time, this message may be changed to the text message and displayed on the monitor 10.

When the vehicle B is moved backward, an image captured by the rear camera 13 may be displayed on the monitor, and the guide information G may be displayed on this image. In this configuration a navigation mark H is set to a position corresponding to a rear end of the vehicle B, and a guide information G may be displayed in the image to assist the driver to move the vehicle B backward until the guide information overlaps the navigation mark H as illustrated FIGS. 14 and 15.

While the vehicle B is moved backward, a passage upon which the vehicle B has been moved and the estimated locus C may now be displayed on the monitor 10 in different colors. In this configuration, the driver can easily confirm on the monitor 10 whether or not the vehicle B is moved along the locus C.

As the vehicle B is moved backward with rotating the steering wheel 4 so as to follow the message outputted or displayed, the fourth guide information G4 appears from lower side of the monitor 10 so that the driver recognizes the guide information G4 on the monitor 10. Finally, the guide information G4 is enclosed by the navigation mark H, for example the guide information G4 overlaps the navigation mark H. When the guide information G4 overlaps the navigation mark H, a message such as "parking operation has been completed" is outputted by the speaker 11. At the same time, this message may be changed to the text message and displayed on the monitor 10. At the time when the parking operation is finished, the vehicle B exists within the parking area 45.

While the parallel parking operation has been operated, in order to guide the vehicle B to be in the parking position P appropriately, even when the vehicle B is moved backward, at the time when the guide information G overlaps the navigation mark H, the driver needs to confirm this on the image captured by the front camera 12.

Thus, while the vehicle B is moved backward, the display 10 may switch between the image captured by the front camera 12 and the image captured by the rear camera 13 to be displayed, or the monitor 10 may display both the image from the front camera 12 in a half size and an image from the rear camera 13 in a half size at the same time.

Thus, according to the embodiment, the driver executes an operation to specify the parking position on the monitor 10 on which an image captured by the front camera 12 and selects a mode of parking. On the basis of the selected parking mode, a locus C is automatically calculated to guide the vehicle B to be in the parking position P. Further plural target positions are set upon the locus C and a posture of the vehicle at each target position is also set.

Further, when the vehicle B is guided to be in the parking position P, although the plural target positions are set, only one guide information G, which is formed in a line shape corresponding to a specific target position, appears on the monitor 10, at the same time, the navigation mark H appears on the monitor 10, and a voice message or a text information is outputted. The driver simply follows the voice message or the text information to move the vehicle so that the guide information G is enclosed by the navigation mark H, in other words, the guide information G overlaps the navigation mark H.

Further, after the vehicle B is moved so that the guide information G overlaps the navigation mark H, next guide information G appears on the monitor 10, in other words, in this embodiment, only one guide information is displayed on the monitor 10. Thus, chances that the driver misunderstands and follows inappropriate target is reduced, as a result, the vehicle B is moved to the parking position P along an appropriate locus C.

Specifically, when the vehicle B is moved toward the guide information G, because a moving direction, a steering angle, a moving amount of the vehicle B are detected, a relative positional relation between the vehicle B and the locus C can be obtained. In this configuration, when the vehicle B is distancing from the locus C, an alarm is outputted in order to notify the driver not following the locus C. The driver can adjust the movement of the vehicle B so as to follow the locus C.

Another embodiment will be explained.

Figure 14:
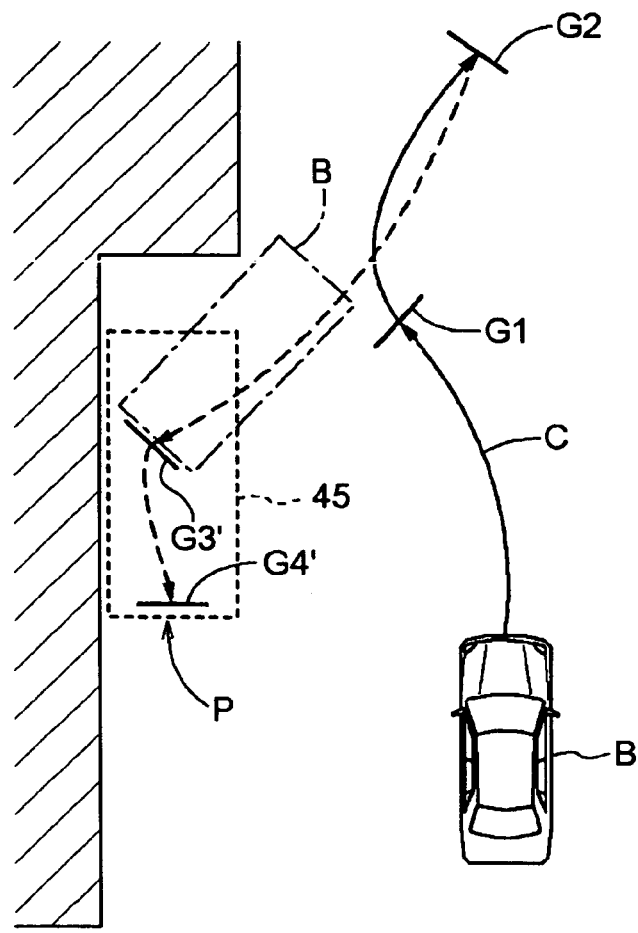
FIG. 14 illustrates a position of a locus and a guide information according to another embodiment of the present invention.
Figure 15:
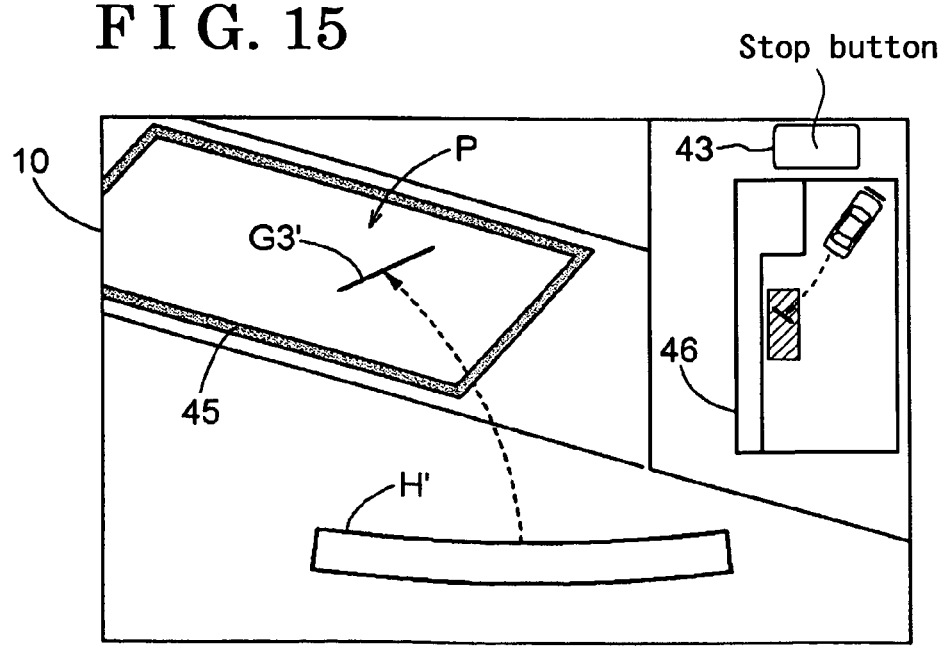
FIG. 15 illustrates a diagram indicating an image captured by a rear camera and displayed on the monitor.

As illustrated in FIGS. 14 and 15, when the vehicle B is moved backward, the assist information output means outputs an image captured by the rear camera 13 so as to be displayed on the monitor 10, and a guide information G is displayed on the ground in the displayed image on the monitor 10, so that the vehicle B is guided to be in the parking position P on the basis of the parking position P.

Specifically, within a range in which the vehicle B is moved forward following the locus C, target positions are set on the basis of the front end of the vehicle B, and guide information G1 and G2 are set corresponding to the target positions. On the other hand within a range in which the vehicle B is moved backward following the locus C, target positions are set on the basis of the rear end of the vehicle B, and guide information G3' and G4' are set corresponding to the target positions. When the vehicle B is moved backward, an image captured by the rear camera 13 is displayed on the monitor 10, and the guide information G3' and G4' are displayed on this image. Further, at the lower portion of the monitor 10, a navigation mark H' corresponding to the rear end of the vehicle B is displayed.

Thus, when the vehicle B is moved backward to be in the parking position P, an image captured by the rear camera 13 is displayed on the monitor 10. For example, as illustrated in FIG. 15, the vehicle B is moved backward until the guide information G3' displayed on the ground in the displayed image overlaps the navigation mark H' so that the vehicle B is guided to the parking position P with following the appropriate locus C in the same manner as the abovementioned embodiment.

Information from sensors such as the steering sensor, the shift position sensor and the moving distance sensor may not be sent to the parking assist ECU 17 as a feedback. In this configuration, only a guide information corresponding to a target position and the navigation mark may be displayed on the monitor, however, the driver can move the vehicle so as to be in a parking position P in a manner where the guide information overlaps the navigation mark.

At least one of an image from the front camera and an image from the rear camera may be processed, and a position of the vehicle B is obtained and displayed on the sub window so that the driver understands the relative position between the vehicle B and the parking position. In this configuration, without providing plural sensors, the driver can understand the position of the vehicle B, as a result, the parking operation is executed appropriately.

According to the embodiment, when the vehicle is guided to be in the parking position, the assist information output means calculates a locus for guiding the vehicle to be in the parking position, sets target positions on the locus, and outputs guide information corresponding to each target position and displays the guide information on the monitor.

Further, the assist information output means outputs a navigation mark, corresponding to a current position of the vehicle and displays the navigation mark on the monitor. Thus, the driver moves the vehicle in a manner where, on the monitor, the guide information overlaps the navigation mark so that the vehicle moves so as to follow the locus.

Specifically, because the guide information positioned in a moving direction of the vehicle is displayed on the ground in the image displayed on the monitor, the driver moves the vehicle so as to follow the appropriate locus by moving the vehicle in a manner where the guide information overlaps the navigation mark.

As a result, even when the vehicle is parallel-parked by moving the vehicle back and forth and rotating the steering wheel in one direction and the other direction, the driver appropriately moves the vehicle, on the basis of the information displayed on the monitor, to be in the parking position.

According to the embodiment, when the vehicle is guided to be in the parking position, the assist information output means calculates a locus to guide the vehicle to be in the parking position, sets a target position on the locus, and outputs guide information corresponding to the target position and displays the guide information on the monitor.

Further, when the vehicle is moved forward, an image captured by the front camera is displayed on the monitor, and a guide information corresponding to a target position within the front area of the vehicle is displayed on the ground in the image displayed on the monitor, and a navigation mark corresponding to a front end of the vehicle is displayed on the monitor. Thus, the driver moves the vehicle toward the guide information displayed on the monitor so that the vehicle is moved so as to follow the appropriate locus.

Further, when the vehicle is moved backward, an image captured by the rear camera is displayed on the monitor, and a guide information corresponding to a target position within the rear are of the vehicle is displayed on the ground in the image displayed on the monitor, and a navigation mark corresponding to a rear end of the vehicle is displayed on the monitor. Thus, the driver moves the vehicle toward the guide information displayed on the monitor so that the vehicle is moved so as to follow the appropriate locus.

As a result, even when the vehicle is guided to be in the parking position by moving the vehicle back and forth, because both of the images captured by the front camera and the rear camera are displayed on the monitor, the driver easily confirms the current position of the vehicle so that the parking operation is executed appropriately.

According to the embodiment, when the vehicle is guided to be in the parking position, once the guide information displayed on the ground in the image displayed on the monitor overlaps the navigation mark, and the vehicle is stopped, the guide information is deleted from the monitor, and a next guide information is displayed on the monitor. Thus, the driver is prevented from selecting an inappropriate guide information, as a result, even when the locus is complicated, the vehicle is guided to be in the parking position by selecting an appropriate locus.

According to the embodiment, because the driver visually confirms the locus on the monitor, the vehicle is guided to be in the parking position more precisely.

According to the embodiment, as the vehicle is moved, the driver moves the vehicle in a manner where the guide information formed in a line shape reaches the frame shaped navigation mark, and eventually the guide information is enclosed by the navigation mark formed in a frame shape corresponding to the front portion or the rear portion of the vehicle. Thus, a posture of the vehicle relative to the locus is appropriately set.

According to the embodiment, the vehicle moving forward may be switched to move backward at the timing where the guide information overlaps the navigation mark, or the vehicle moving backward may be switched to move forward at the timing where the guide information overlaps the navigation mark. Thus, operationality may be improved.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A parking assist apparatus comprising:
a monitor displaying an image captured by a camera mounted to a vehicle for capturing an image in a moving direction of the vehicle; and
assist information output means outputting assist information for assisting a parking operation and displaying the assist information on the monitor, wherein
the assist information output means:
calculates a locus for guiding the vehicle to a parking position specified on the image displayed on the monitor;
sets a target position on the locus for guiding the vehicle to the parking position;
outputs guide information, which corresponds to the target position and which indicates a posture of the vehicle at the target position so as to be displayed on the locus in the image displayed on the monitor; and
outputs a navigation mark corresponding to a current position of the vehicle so as to be displayed on the monitor; and
wherein either one of the guide information and the navigation mark is formed in a line shape and the other of the guide information and the navigation mark formed in a frame shape enclosing the either one of the guide information and the navigation mark, which is formed in the line shape.

2. A parking assist apparatus comprising:
a monitor displaying an image captured by one of a front camera and a rear camera, the front camera mounted to a vehicle for capturing an image of a front area of the vehicle and the rear camera mounted to a vehicle for capturing an image of a rear area of the vehicle; and assist information output means outputting assist information for assisting a parking operation and displaying the assist information on the monitor, wherein
the assist information output means:
calculates a locus for guiding the vehicle so as to be in a parking position specified on the image displayed on the monitor;
sets a target position on the locus for guiding the vehicle to the parking position within the front area of the vehicle on the basis of a front end of the vehicle;
sets a target position on the locus for guiding the vehicle to the parking position within the rear area of the vehicle on the basis of a rear end portion of the vehicle;
outputs, while the vehicle is moving forward, guide information corresponding to the target position set within the front area of the vehicle so as to be displayed on a ground in the image of the front area displayed on the monitor;
outputs, while the vehicle is moving forward, a navigation mark corresponding to a current position of a front end of the vehicle so as to be displayed on the monitor;
outputs, while the vehicle is moving backward, guide information corresponding to the target position set within the rear area of the vehicle so as to be displayed on a ground in the image of the rear area displayed on the monitor; and
outputs, while the vehicle is moving backward, a navigation mark corresponding to a current position of a rear portion of the vehicle so as to be displayed on the monitor;
wherein, on the monitor, a color of the navigation mark differs from a color of the guide information.

3. The parking assist apparatus according to claim 1, wherein the assist information output means sets plural target positions on the locus, and once the vehicle reaches a position at which the navigation mark overlaps a guide information corresponding to one of the target positions, the guide information disappears from the monitor, and then a guide information corresponding to another target position for guiding the vehicle from the current position to a next position is displayed on the monitor.

4. The parking assist apparatus according to claim 1, wherein the assist information output means outputs a locus, by which the vehicle is moved from the current position to the target position, so as to be displayed on the monitor.

5. The parking assist apparatus according to claims 1, wherein the guide information corresponding to the target position is formed in the line shape, and the navigation mark is formed in the frame shape in order to enclose the guide information, so that, when the vehicle is moved in a manner where the navigation mark is aligned with the target position, the posture of the vehicle is defined.

6. The parking assist apparatus according to claim 1, wherein the locus includes a forward movement area and a backward movement area, and the target position is set at a position between the forward movement area and the backward movement area.

7. The parking assist apparatus according to claim 2, wherein the assist information output means sets plural target positions on the locus.

8. The parking assist apparatus according to claim 2, wherein, when parallel parking is executed, the assist information output means sets four target positions on the locus.

9. The parking assist apparatus according to claim 2, wherein the target position is set at one of: a position where an operating direction of the steering wheel is changed from one direction to the other direction, and a position where a moving direction of the vehicle is changed.

* * * * *